(12) United States Patent
Jung et al.

(10) Patent No.: US 10,889,483 B2
(45) Date of Patent: Jan. 12, 2021

(54) WATER PURIFIER

(71) Applicant: LG ELECTRONICS INC., Seoul (KR)

(72) Inventors: Soonki Jung, Seoul (KR); Minho Kim, Seoul (KR); Hoon Jang, Seoul (KR); Jingyu Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/670,439

(22) Filed: Oct. 31, 2019

(65) Prior Publication Data

US 2020/0156921 A1 May 21, 2020

(30) Foreign Application Priority Data

Nov. 19, 2018 (KR) .......................... 10-2018-0142726

(51) Int. Cl.
*B67D 1/00* (2006.01)
*B67D 1/08* (2006.01)
*C02F 1/00* (2006.01)

(52) U.S. Cl.
CPC ......... *B67D 1/0889* (2013.01); *B67D 1/0014* (2013.01); *C02F 1/003* (2013.01); *B67D 1/0006* (2013.01); *B67D 1/0085* (2013.01); *B67D 1/0859* (2013.01); *B67D 1/0887* (2013.01); *B67D 1/0888* (2013.01); *B67D 2001/0095* (2013.01); *B67D 2210/0001* (2013.01); *B67D 2210/00031* (2013.01); *B67D 2210/00041* (2013.01); *C02F 2307/10* (2013.01)

(58) Field of Classification Search
CPC ................ B67D 1/0889; B67D 1/0014; B67D 2001/0095; B67D 2210/0001; B67D 2210/00031; B67D 2210/00041; B67D 1/0888; B67D 1/0085; B67D 1/0859; B67D 1/0006; B67D 1/0081; B67D 1/0887; B67D 2210/00144; C02F 1/003; C02F 2307/10
See application file for complete search history.

(56) References Cited

U.S. PATENT DOCUMENTS

| 4,844,300 | A | * | 7/1989 | Simons | ..................... | B67D 1/06 222/108 |
| 9,856,126 | B2 | * | 1/2018 | Jeon | ........................ | C02F 1/003 |

(Continued)

FOREIGN PATENT DOCUMENTS

| JP | H07-280632 | 10/1995 |
| JP | 2010-117359 | 5/2010 |

(Continued)

OTHER PUBLICATIONS

Korean Notice of Allowance dated Sep. 16, 2019 issued in KR Application No. 10-2018-0142726.

*Primary Examiner* — Frederick C Nicolas
(74) *Attorney, Agent, or Firm* — Ked & Associates, LLP

(57) ABSTRACT

A liquid dispenser includes a case and a dispenser, and dispenser includes a dispenser side cover, a first lifting cover, a second lifting cover, and a dispenser nozzle. The first lifting cover includes a guide rail and the second lifting cover includes a coupling bracket provided with a magnet. As the coupling bracket is slidably moved along the guide rail by the attractive force being applied between the magnet and the guide rail, the second lifting cover is lifted and lowered from the first lifting cover.

20 Claims, 9 Drawing Sheets

(56) References Cited

U.S. PATENT DOCUMENTS

| | | | |
|---|---|---|---|
| 10,267,535 B2* | 4/2019 | Jeon | B01D 61/145 |
| 10,343,888 B2* | 7/2019 | Jeon | A47J 31/4482 |
| 2004/0056048 A1 | 3/2004 | Kaartinen | |
| 2011/0114680 A1* | 5/2011 | Haskayne | B67D 1/0831 |
| | | | 222/526 |
| 2017/0319990 A1* | 11/2017 | Jeon | B01D 35/1573 |
| 2017/0320721 A1* | 11/2017 | Choi | H05B 6/108 |
| 2017/0321927 A1* | 11/2017 | Jeon | B01D 29/56 |
| 2017/0321931 A1* | 11/2017 | Choi | B67D 1/0014 |
| 2018/0016128 A1* | 1/2018 | Park | C02F 1/283 |
| 2018/0016129 A1* | 1/2018 | Park | C02F 1/18 |
| 2018/0056217 A1* | 3/2018 | Park | B01D 35/306 |
| 2018/0194608 A1* | 7/2018 | Jeon | B67D 1/0888 |
| 2019/0060801 A1* | 2/2019 | Jeon | C02F 1/003 |
| 2019/0060803 A1* | 2/2019 | Jeon | B01D 35/303 |
| 2019/0060806 A1* | 2/2019 | Jeon | B01D 35/303 |
| 2019/0060807 A1* | 2/2019 | Jeon | B01D 35/18 |
| 2019/0276299 A1* | 9/2019 | Park | C02F 1/001 |
| 2019/0308892 A1* | 10/2019 | Yu | C02F 1/003 |
| 2019/0377973 A1* | 12/2019 | Jin | B67D 1/0014 |
| 2019/0382254 A1* | 12/2019 | Kim | C02F 1/32 |
| 2019/0382281 A1* | 12/2019 | Moon | C02F 1/003 |
| 2019/0389712 A1* | 12/2019 | Kim | B67D 1/0878 |
| 2020/0156920 A1* | 5/2020 | Jung | B67D 1/0006 |
| 2020/0165118 A1* | 5/2020 | Kim | B67D 1/0888 |
| 2020/0216331 A1* | 7/2020 | Jeon | C02F 1/003 |

FOREIGN PATENT DOCUMENTS

| | | |
|---|---|---|
| KR | 10-2010-0054580 | 5/2010 |
| KR | 10-1818390 | 1/2018 |

* cited by examiner

WATER PURIFIER

CROSS-REFERENCE TO RELATED APPLICATION

This application claims priority under 35 U.S.C. § 119 to Korean Application No. 10-2018-0142726 filed on Nov. 19, 2018, whose entire disclosure is hereby incorporated by reference.

BACKGROUND

1. Field

A water purifier is disclosed herein.

2. Background

A water purifier may correspond to a device for filtering predetermined water to supply purified water from which impurities have been removed. Water purifiers are widely used throughout household appliances or industries. In particular, the water purifier may be provided as a domestic water purifier which provides a user-consumable water purifier.

The water purifier may include a water purifier main body on which a filter or the like is mounted and a water outflow part which provides water filtered at the water purifier main body. The water outflow part may be fixedly disposed on a front surface of the water purifier main body. Accordingly, the user may place a container or the like, which receives water, in the water outflow part to take purified water.

With such a structure, since the user is restrained at the position of the water outflow part, there is a problem that the user's convenience cannot be secured. In order to solve such a problem, the present applicant filed and registered the related art 1 as follows.

1. Registration number: No. 10-1818390 (Publication date: Jan. 12, 2018). 2. Title of invention: Water purifier.

Related art 1 discloses a water purifier in which a water outflow module including a water outflow nozzle is provided so as to be capable of being lifted and lowered. The water outflow module may be lifted and lowered by a gear rotated along a linear rack provided on one side thereof. In addition, resistance means for reducing lifting and lowering force of the water outflow module is provided to adjust the lifting and lowering of the water outflow module.

Related art 1 configured in this way has a problem that it requires a complicated configuration such as a linear rack, a gear to be rotated, a resistance means, and the like. Also, the lifting and lowering thereof cannot be performed smoothly, and thus there is a problem that Related art 1 gives inconvenience to the user.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
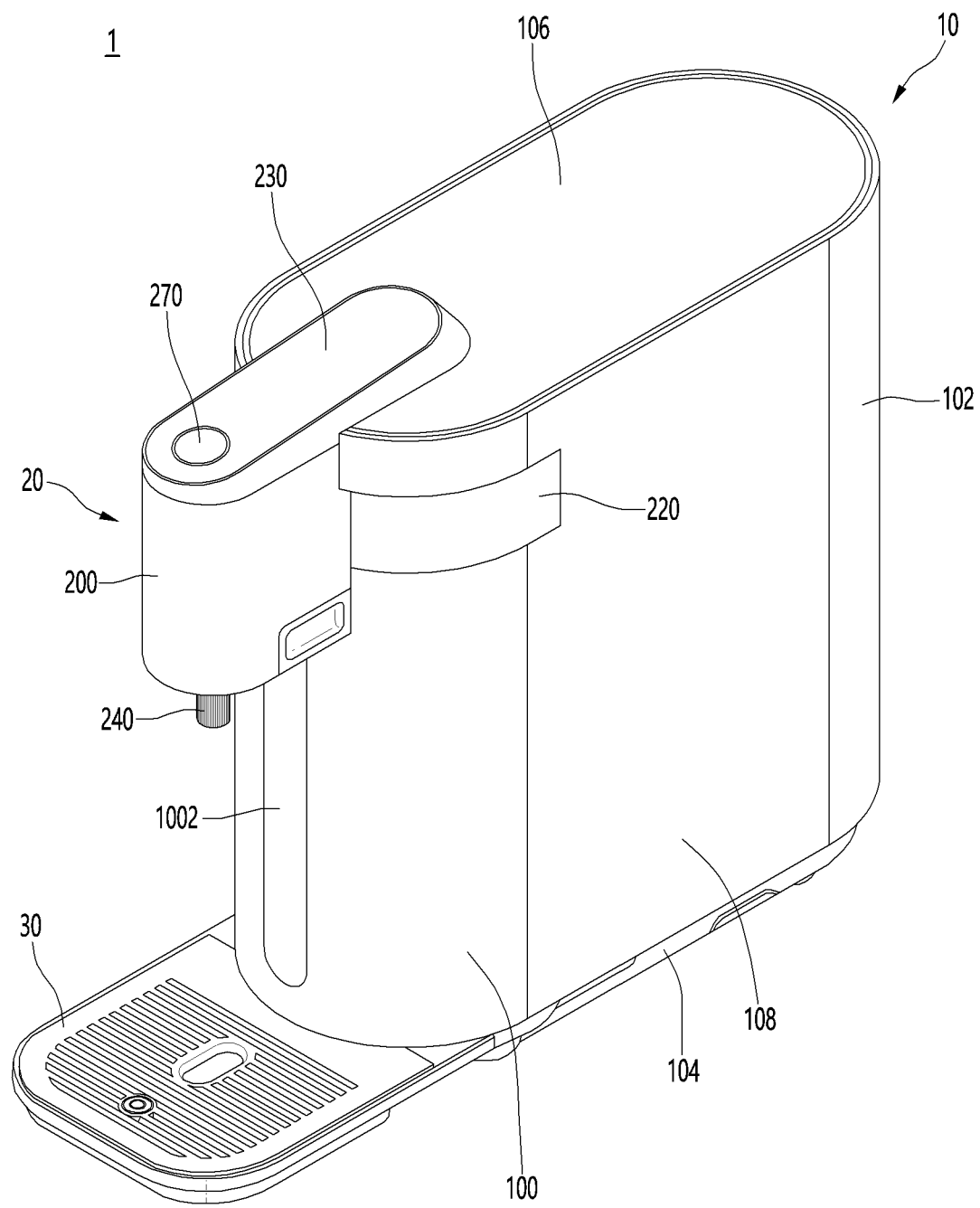
FIG. 1 illustrates a water purifier according to an embodiment of the present disclosure.

As illustrated in FIG. 1, a water purifier (or liquid dispenser) 1 according to an embodiment of the present disclosure may include a case 10 forming an outer appearance and a water outflow unit (or dispenser) 20 coupled to one side of the case 10. The case 10 may form an internal space in which various components to be described below may be installed. For example, the case 10 may be provided in a cylindrical shape, as illustrated in FIG. 1. However, the cylindrical shape is an exemplary shape, and the case 10 may be provided in various shapes.

The case 10 may be formed by coupling a plurality of plates. Specifically, the case 10 may include a front cover 100, a rear cover 102, a base cover 104, a top cover 106, and a pair of side covers 108. At this time, each cover may form an outer appearance of a front surface, a rear surface, a lower surface, an upper surface, and both side surfaces of the water purifier 1.

Each of the covers may be coupled to each other via a coupling member or a coupling structure. The front cover 100 and the rear cover 102 may be spaced apart from each other in a front and rear direction. The pair of side covers 108 may respectively connect the front cover 100 and the rear cover 102 to each other to form the circumference of the water purifier 1.

The top cover 106 may be coupled to the upper ends of the front cover 100, the rear cover 102, and the pair of side covers 108. The base cover 104 may be coupled to the lower ends of the front cover 100, the rear cover 102, and the pair of side covers 108. The base cover 104 may be a part which is seated on a surface on which the water purifier 1 is installed.

The front cover 100 and the rear cover 102 may have a predetermined curvature, and the pair of side covers 108 may each be formed as a flat plate. The front cover 100 and the rear cover 102 may be convexly formed in the front and rear direction, respectively. The base cover 104 and the top cover 106 may correspond to the front cover 100 and the rear cover 102 and the front end and the rear end thereof may be rounded.

A flat part or insert 1002 may be formed in or at a center of the front cover 100 in a vertical direction. The flat insert 1002 may function as a center point of rotation of the dispenser 20, which will be described below.

The flat part 1002 may be understood as a part recessed in the front cover 100 convexly protruding in the front direction. The front surface of the front cover 100 may correspond to a part in which a container such as a cup (hereinafter referred to as a water or liquid intake container) which takes water or liquid by the user is disposed. Accordingly, the flat part 1002 may allow the user to place the liquid container deeper and the liquid container may be stably supported.

The water purifier 1 may also include a tray 30 on which the water intake container is seated. The tray 30 may be connected to the base cover 104 and protrude in the front direction. Therefore, it may be understood that the tray 30 forms the lower surface of the water purifier 1 together with the base cover 104.

The tray 30 may be positioned below a water outflow or dispenser nozzle 240 to be described below in the vertical direction. The tray 30 may include a structure for storing water dispensed from the dispenser nozzle 240 and not received in the liquid container. For example, the tray 30 may be provided in a shape in which a grill and a storage part below the grill are provided.

The dispenser 20 may be coupled to one side of the case 10 in a protruding manner. The dispenser 20 may protrude forward from the front cover 100 and the top cover 106. The dispenser 20 may communicate with and be coupled to the case 10.

The dispenser 20 may include a water outflow or dispenser top cover 230, water outflow or dispenser lifting and lowering covers 200 and 210, and a water outflow or dispenser side cover 220. Each cover may form an outer appearance of the dispenser 20.

Figure 3:
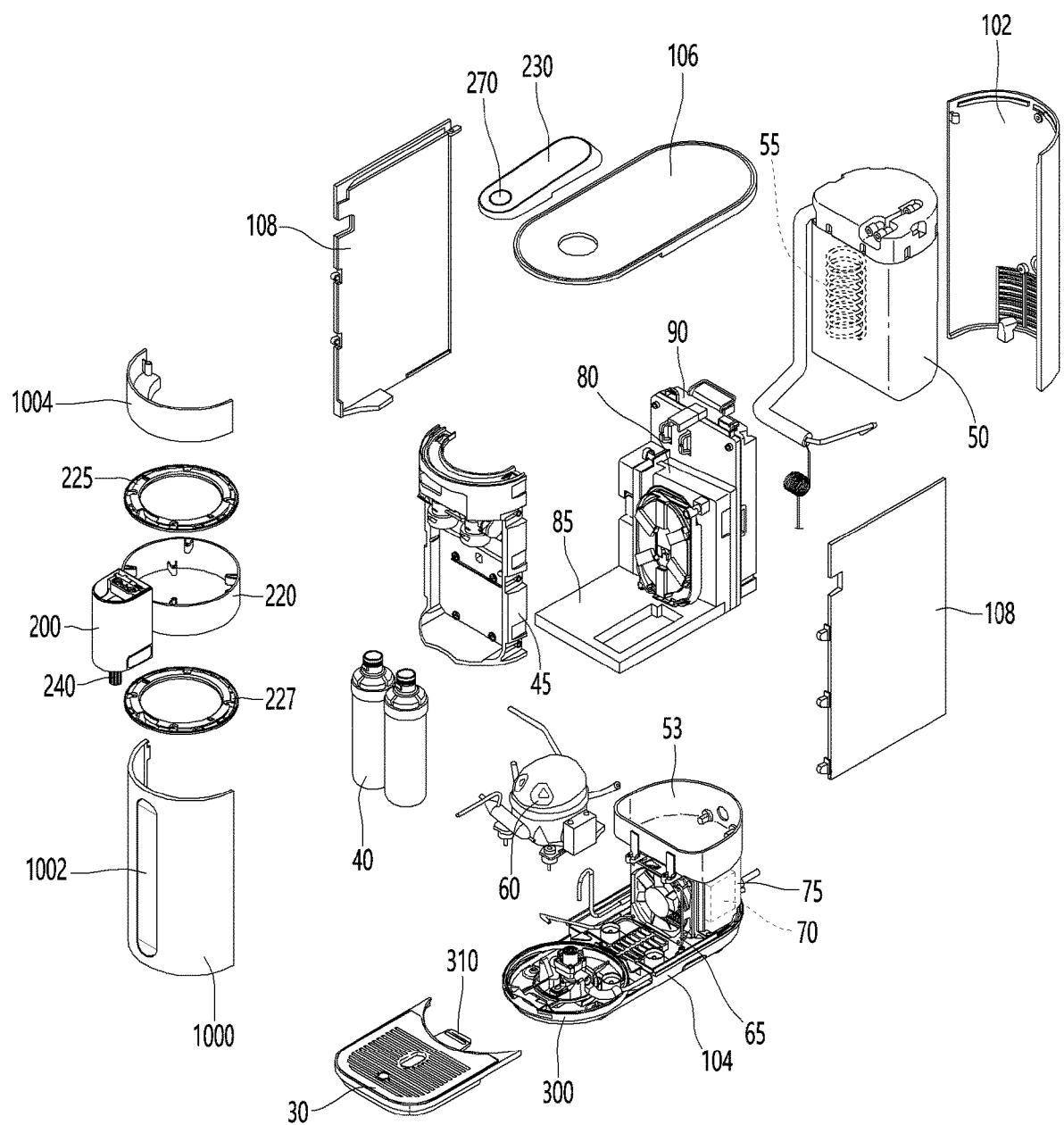
FIGS. 3 and 4 are exploded views illustrating a water purifier according to an embodiment.

The dispenser side cover 220 may correspond to a configuration which is seated in the case 10. Referring to FIG. 3, which will be described below, the dispenser side cover 220 may be provided in a cylindrical shape corresponding to the curvature of the front cover 100. In addition, the dispenser side cover 100 may divide the front cover 100 into upper and lower parts. Accordingly, the front cover 100 may be divided into a lower front cover 1000 coupled to the base cover 104 and an upper front cover 1004 coupled to the top cover 106.

The upper front cover 1004 may have a smaller sectional area than the lower front cover 1000. Therefore, the upper front cover 1004 may be an auxiliary part that forms the outer appearance. The lower front cover 1000 may be a part formed with the flat part 1002 and provided on a first side of the liquid container.

The dispenser lifting and lowering covers 200 and 210 may protrude from the front cover 100 in the front direction. The dispenser lifting and lowering covers 200 and 210 may convexly protrude from the dispenser side cover 220 in an outer direction. The dispenser top cover 230 may extend from the top cover 106 and cover the upper ends of the dispenser lifting and lowering covers 200 and 210.

The dispenser top cover 230 may include various input units (or inputs) 270 through which a user may input a predetermined command. The input 270 may be provided in various forms such as a button type and a touch type. In addition, although the input 270 is illustrated in FIG. 1 as one unit, the input 270 may be provided in various numbers.

The dispenser 20 may further include the dispenser nozzle 240 for dispensing a predetermined amount of water. The dispenser nozzle 240 may extend downward and may be exposed to the lower part of the dispenser lifting and lowering cover 200 and 210. As described above, the tray 30 may be provided below the dispenser nozzle 240 in a vertical direction.

A water outflow pipe connected to the dispenser nozzle 240 may be provided inside the dispenser 20. The water outflow pipe may extend from an inner part of the case 10 to the inside of the dispenser 20 and may be coupled to the dispenser nozzle 240. The dispenser 20 of the water purifier 1 according to an embodiment may be moved so that the position of the dispenser nozzle 240 is changed. Hereinafter, this will be described in detail.

Figure 2:
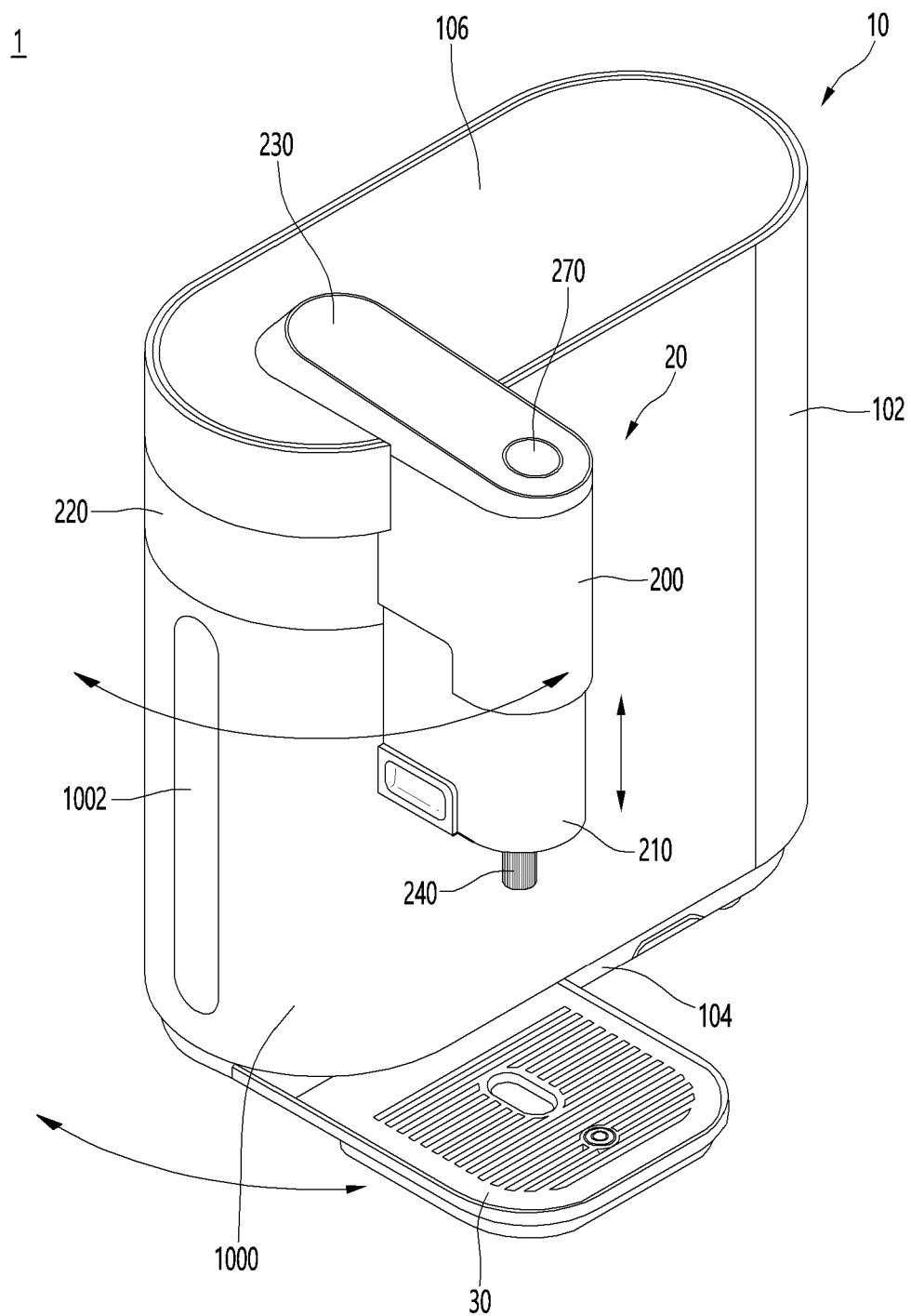
FIG. 2 illustrates a state where a position of a water outflow nozzle of a water purifier according to an embodiment is changed.

As illustrated in FIG. 2, the dispenser 20 may be moved to be rotated or lifted and lowered. Accordingly, the dispenser nozzle 240 may be rotated or lifted and lowered. The tray 30 may also be rotated according to the rotation of the dispenser nozzle 240.

First, the rotation of the dispenser 20 will be described. The dispenser 20 may be rotated as the dispenser side cover 220 is rotated. In other words, as the dispenser side cover 220 is rotated, the dispenser lifting and lowering cover 200 and 210, the dispenser top cover 230, and the dispenser nozzle 240 may be rotated.

The dispenser 20 may be rotated along the front cover 100 and may have a rotation radius of about 180 degrees. In addition, since the input 270 may be formed on the dispenser top cover 230, the input 270 may be rotated together with the dispenser 20 so that the convenience of the user may be corrected.

The tray 30 may be rotatably coupled to the base cover 104 and may rotate in correspondence with the dispenser 20. Therefore, the tray 30 may also have a rotation radius of about 180 degrees.

A description will be given of the lifting and lowering of the dispenser 20. The dispenser lifting and lowering cover may include a stationary cover 200 and a adjustable cover 210 movably coupled to the stationary cover 200. The stationary cover 200 may be fixed to the dispenser side cover 220.

The dispenser top cover 230 may be coupled to the upper end of the stationary cover 200. The adjustable cover 210 may be arranged inside the stationary cover 200 and may be moved vertically along the stationary cover 200. In addition, the dispenser nozzle 240 may be installed on the adjustable cover 210 and may be moved together with the adjustable cover 210.

The rotation and lifting and lowering of the dispenser 20 may be performed independently of each other. In other words, the rotation and lifting and lowering of the dispenser 20 may be performed simultaneously or separately. For example, the rotation of the dispenser 20 may be performed according to the installation site, and the lifting and lowering of the dispenser 20 may be performed according to the height of the water intake container.

The dispenser 20 may include a structure which is rotated or lifted and lowered. In other words, the dispenser 20 may have a structure which is not rotated but is lifted and lowered. Accordingly, the dispenser side cover 220 may be fixedly provided in the case 10.

Figure 4:
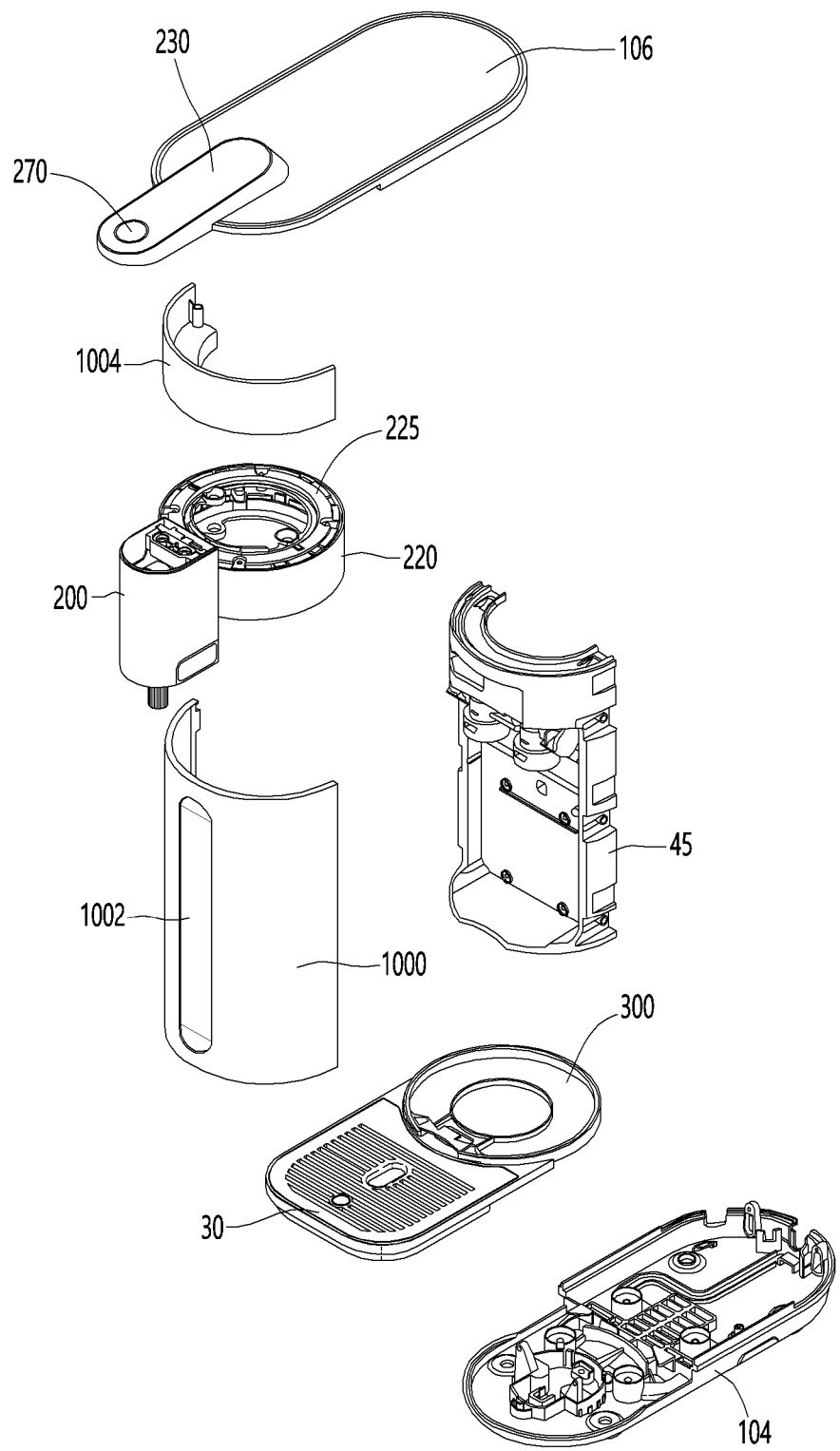

The water purifier 1 illustrated in FIGS. 3 and 4 may have a configuration capable of supplying purified water or liquid, cold water or liquid, and hot water or liquid. However, this is an illustrative example, and the configuration of the water purifier 1 is not limited thereto and may be omitted or added. In addition, FIGS. 3 and 4 are illustrated in a state where a pipe through which water flows is omitted for convenience of description.

As illustrated in FIGS. 3 and 4, the water purifier 1 may include a filter 40, a cooling tank 50, a compressor 60, a condenser 70, and an induction heating assembly 80, which are disposed in the case 10. In addition, a filter bracket 45 on which the filter 40 is mounted may be provided in the case 10.

The filter bracket 45 may be seated on the base cover 104 adjacent to the front cover 100. The dispenser side cover 220 may be seated on the filter bracket 45. In other words, the filter bracket 45 may have a height corresponding to a height of the lower front cover 1000.

The upper and lower ends of the filter bracket 45 may have the form of a semi-circle having a curvature corresponding to the front cover 100. The filter bracket 45 may form a space recessed in a rear direction so that the filter 40 can be received.

The filter 40 may be provided in a space formed between the filter bracket 45 and the front cover 100. The filter 40 may be configured to combine filters having various functions for purifying raw water (tap water) to be supplied. In other words, the filter 40 may be provided in various numbers and various shapes.

The filter bracket 45 may include various valves to be connected to the respective pipes. For example, a pipe through which the water flowing into the filter 40 flows, a pipe through which the purified water through the filter 40 flows, or the like may be connected.

Purified water or liquid at the filter 40 may be supplied to the cooling tank 50 and the induction heating assembly 80 or the water outflow nozzle 240. In other words, the purified water or liquid at the filter 40 may be supplied in a form of cold liquid, hot liquid, or purified liquid.

The compressor 60 and the condenser 70 together with the evaporator 55 provided inside the cooling tank 50 may form a refrigeration cycle. In other words, the compressor 60 and the condenser 70 may be understood as a configuration for supplying cold water.

The compressor 60 and the condenser 70 may be seated on the base cover 104. The compressor 60 and the condenser 70 may be arranged behind the filter bracket 45. A cooling fan 65 may be provided between the compressor 60 and the condenser 70. The cooling fan 65 may be configured to cool the compressor 60 and the condenser 70.

The compressor 60 may use an inverter-type compressor capable of adjusting the cooling capacity by varying the frequency. Therefore, purified water may be efficiently cooled, thereby reducing power consumption.

The condenser 70 may be located at a position corresponding to the discharge port formed in the rear cover 102. The condenser 70 may be formed by bending a flat tube-type refrigerant tube several times in order to efficiently use the space and improve the heat exchange efficiency.

The condenser 70 may be received on the condenser bracket 75. The condenser bracket 75 may have a shape corresponding to the overall shape of the condenser 70 so as to receive the condenser 70. The condenser bracket 75 may be formed such that the cooling fan 65 and the part facing the discharge port of the rear cover 102 are opened, respectively, so that the condenser 70 is effectively cooled.

A tank mounting part or cradle or dock 53, in which the cooling tank 50 is received, may be provided at an upper part of the condenser bracket 75. The tank mounting dock 53 may support the cooling tank 50. For example, the tank mounting dock 53 may be arranged such that the lower end part of the cooling tank 50 may be inserted.

The cooling tank 50 may cool the purified water to produce cold water and may be filled with cooling water for heat exchange with the purified water which flows therein. An evaporator 55 for cooling the cooling water may be received in the cooling tank 50. The purified water may be cooled by allowing the purified water to pass through the inside of the cooling tank.

The induction heating assembly 80 may heat the purified water in an induction heating (IH) manner. The induction heating assembly 80 may instantaneously and rapidly heat the water at the hot water discharge operation and may control the output of the magnetic field to heat the purified water to the desired temperature and provide the purified water to the user. Therefore, hot water having a desired temperature may be discharged according to the user's operation.

The induction heating assembly 80 may be seated and installed in the support plate 85. The support plate 85 may extend from the filter bracket 45 to the cooling tank 50. The support plate 85 may be arranged above the compressor 160.

The water purifier 1 may include a control unit or controller 90. The controller 90 may control the operation of the water purifier 1 by controlling the above-described configurations. The controller 90 may be configured to control the compressor 60, the cooling fan 65, various valves, sensors, the induction heating assembly 80, or the like. The controller 90 may be configured in a modular manner by a combination of PCBs divided into a plurality of parts according to the functions thereof.

The controller 90 may heat the purified water together with the induction heating assembly 80. Accordingly, the controller 90 may be provided on one side of the induction heating assembly 80. The controller 90 may be combined with the induction heating assembly 80 in a single module state and may be seated in the support plate 85.

The water purifier 1 may include a rotation structure of the dispenser 20. In other words, a structure in which the water outflow side cover 220 and the tray 30 are rotatably provided may be provided.

As illustrated in FIGS. 3 and 4, rotation mounting parts or rings 225 and 227 may be provided which are coupled with the dispenser side cover 220. The rotation mounting rings 225 and 227 may be provided in a ring shape having an outer diameter corresponding to the dispenser side cover 220.

For example, the rotation mounting rings 225 and 227 may include guide rails, and the dispenser side cover 220 may be slidably moved along the guide rails. The rotation mounting rings 225 and 227 may include a pair of plates between which a ball bearing or a roller is disposed.

The rotation mounting part may include an upper rotation mounting part or ring 225 coupled to an upper end of the dispenser side cover 200 and a lower rotation mounting part or ring 227 coupled to a lower end. The lower rotation mounting ring 227 may be fixed to the upper end of the filter bracket 45. In addition, the upper rotation mounting ring 225 may be fixed to the lower end of the upper front cover 1104.

As illustrated in FIGS. 3 and 4, a tray mounting part or bracket 300 coupled to the tray 30 may be provided. The tray mounting bracket 300 may be fixed to the base cover 104 and may be provided in a ring shape having an outer diameter corresponding to the front end of the base cover 104.

The tray 30 may include a tray hook 310 coupled to the tray mounting bracket 300. In other words, the tray 30 may be detachably hooked to the tray mounting bracket 300. Accordingly, a user may easily separate and clean the tray 30.

Figure 5:
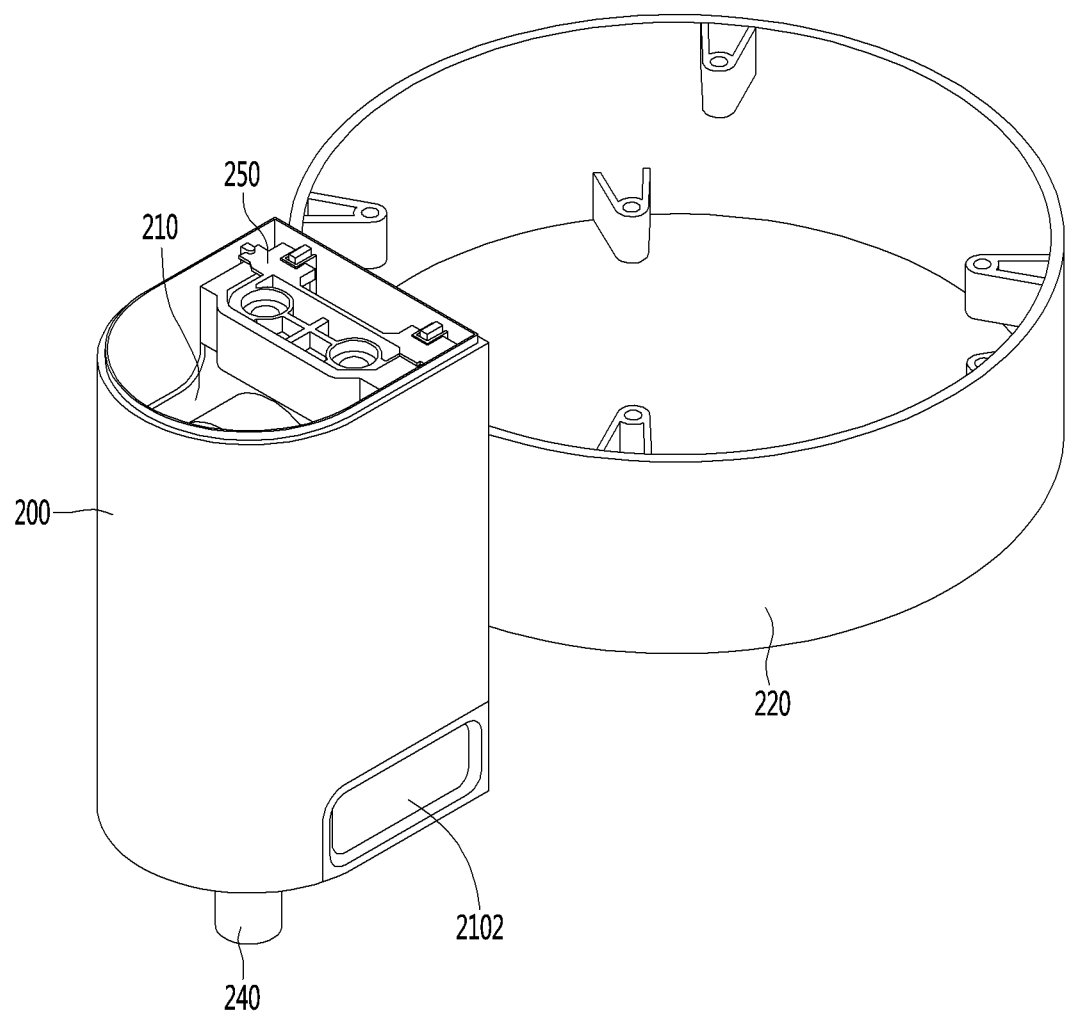
FIG. 5 illustrates a water outflow unit of a water purifier according to an embodiment.
Figure 6:
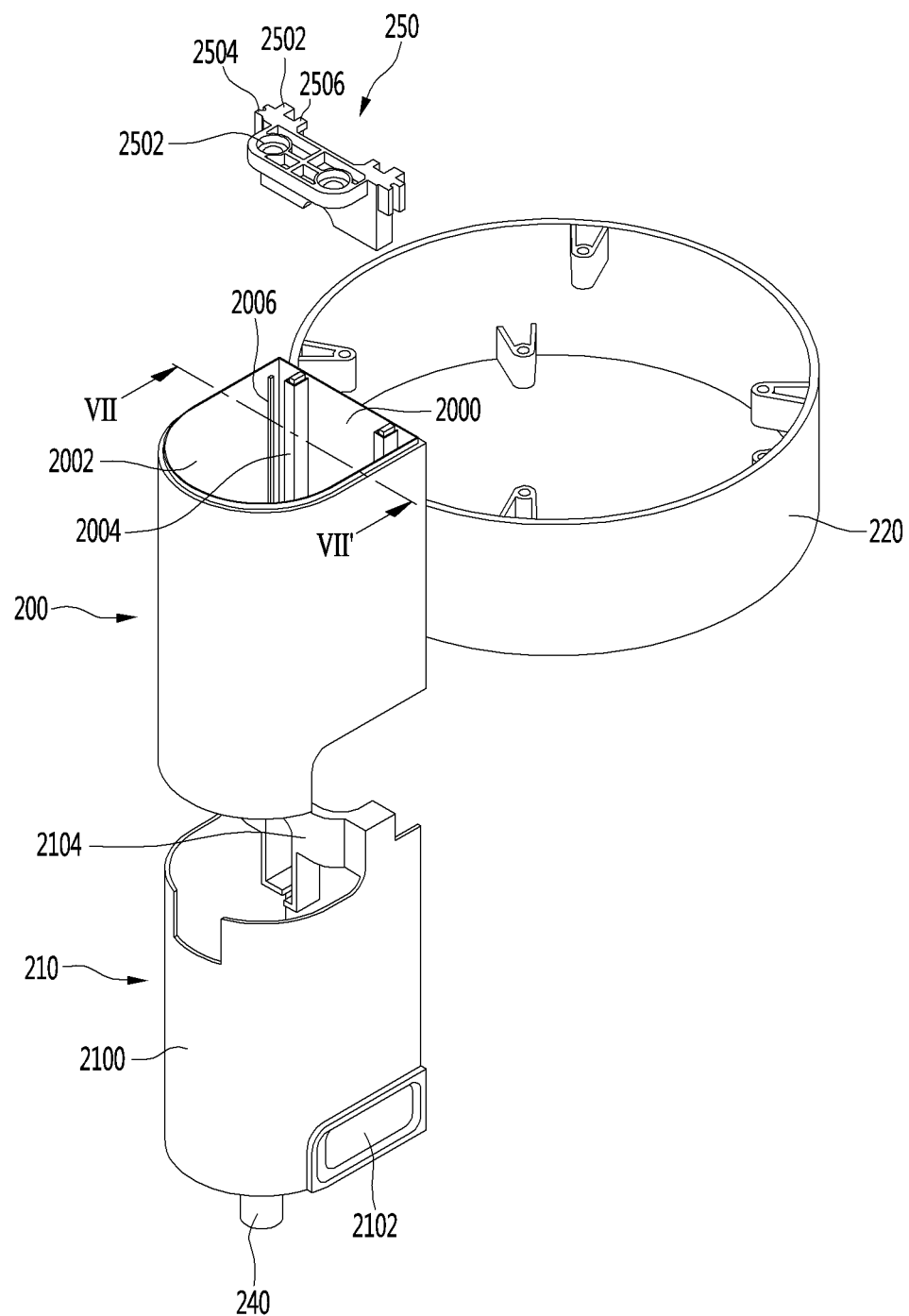
FIG. 6 is an exploded view illustrating the water outflow unit of a water purifier according to an embodiment.

As illustrated in FIGS. 5 and 6, the dispenser 20 may include the dispenser lifting and lowering covers 200 and 210 and the dispenser side cover 220. The stationary cover 200 and the adjustable cover 210 may be included in the dispenser lifting and lowering covers. FIGS. 5 and 6 are illustrated in a state where the dispenser top cover 230 is omitted for convenience of description.

As described above, the dispenser side cover 220 may be provided in a cylindrical shape and may be received in the case 10. In particular, the front side of the dispenser side cover 220 may form an outer appearance of the front surface of the water purifier 1 together with the front cover 100.

The stationary cover 200 may be coupled to the outside of the water outflow side cover 220. The adjustable cover 210 may be movably received in the stationary cover 200.

In other words, the stationary cover 200 may be fixed and the adjustable cover 210 may be moved. However, this is an example, and the first and adjustable covers 200 and 210 may be provided in various forms which are relatively movable. For example, all the first and adjustable covers 200 and 210 may be provided to be movable.

The stationary cover 200 may include a first plate 2000 coupled to the dispenser side cover 220 and a second plate 2002 extending from the first plate 2000. The first plate 2000 and the second plate 2002 may be divided for convenience of description and may be integrally formed with each other.

The first plate 2000 may be a flat plate having a predetermined thickness. Alternatively, the first plate 2000 may be provided in a shape of a curved plate having a curvature corresponding to the dispenser side cover 220.

The second plate 2002 may correspond to a plate which is convexly extended at both ends of the first plate 2000. In other words, the second plate 2002 may correspond to a plate coupled to both ends of the first plate 2000 in a curved shape. Accordingly, a predetermined space (hereinafter referred to as an inner space) may be formed between the first plate 2000 and the second plate 2002.

The inner space may be provided in a state of being opened in the vertical direction. In other words, upper and lower parts of the stationary cover 200 may be provided in a state of being opened. At this time, the upper part of the stationary cover 200 may be coupled to the dispenser top cover 230 and may be closed. In addition, the lower part of the stationary cover 200 may be closed by the adjustable cover 210.

Hereinafter, one surface of the first plate 2000 and the second plate 2002 forming the inner space may be referred to as an inner surface. The surface facing the inner surface may be referred to as an outer surface. The surface to which the first plate 2000 is coupled to the water outflow side cover 220 may correspond to the outer surface.

The outer surface of the second plate 2002 may protrude to a front side of the water purifier 1 and may correspond to a surface which forms an outer appearance. Accordingly, the outer surface of the second plate 2002 may be smoothly formed for aesthetic purposes.

The adjustable cover 210 may be provided inside the stationary cover 200. The adjustable cover 210 may be provided in inner space formed by the first plate 2000 and the second plate 2002 of the stationary cover 200. The adjustable cover 210 may be movable from the inner space of the stationary cover 200 to a space below the stationary cover 200.

A structure in which the water outflow nozzle 240 is installed may be provided at the lower end of the adjustable cover 210. For example, the lower part of the second rising lifting and lowering 210 may be provided with an opening through which the water outflow nozzle 240 is inserted and coupled.

The adjustable cover 210 may include a moving plate 2100 on which the water outflow nozzle 240 is installed. The moving plate 2100 may have a shape corresponding to the second plate 2002. In other words, the moving plate 2100 may be convexly formed in the front direction.

The second plate 2002 may overlap the moving plate 2100 when the adjustable cover 210 lifts. Accordingly, as illustrated in FIG. 5, the moving plate 2100 may be provided inside the second plate 2002 and may not be exposed to the outside.

The moving plate 2100 may include a grip part or grip 2102 which may be gripped by a user. The grip 2102 may be positioned below both side surfaces of the moving plate 2100. The second plate 2100 may be cut so that the grip 2102 is exposed to the outside.

The grip 2102 may be exposed to the outside even in a state where the adjustable cover 210 is lifted. Accordingly, the user may conveniently approach the adjustable cover 210 to move the adjustable cover 210.

The adjustable cover 210 may include a coupling bracket 250. The moving plate 2100 may include a coupling part 2104 which is coupled with the coupling bracket 250. The coupling bracket 250 may be coupled to the moving plate 2100 by a coupling member.

The coupling bracket 250 may be provided on the upper part of the adjustable cover 210. The water outflow nozzle 240 may be provided below the adjustable cover 210. The water outflow nozzle 240 may penetrate the lower end of the moving plate 2100. Thereafter, the water discharged from the water outflow nozzle 240 may flow downward.

The coupling part 2104 may be provided on the upper side of the moving plate 2100. In a case where the coupling bracket 250 is coupled to the coupling part 2104, the upper end of the coupling bracket 250 may be aligned with the upper end of the moving plate 2100.

Figure 7:
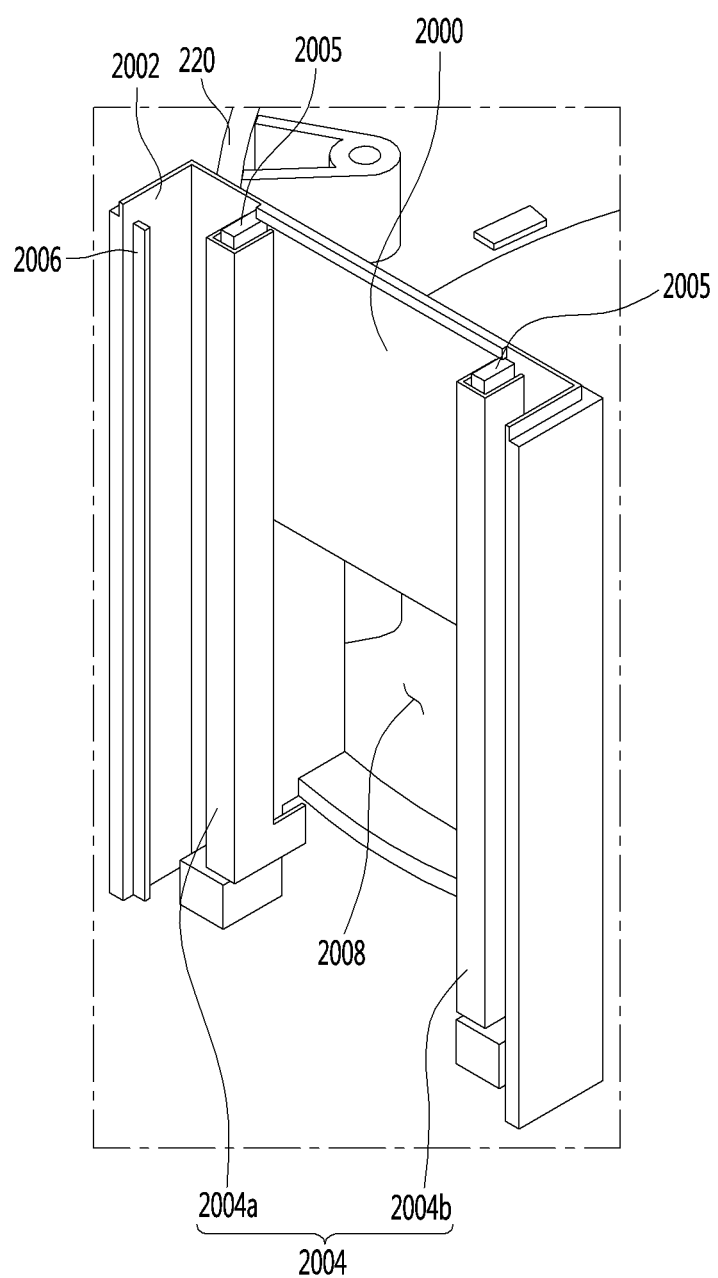
FIG. 7 is a sectional view taken along line VII-VII' of FIG. 6.

As illustrated in FIG. 7, the stationary cover 200 may include a guide rail 2004 extending in the vertical direction. The guide rail 2004 may extend from the upper end to the lower end of the first plate 2000.

The guide rail 2004 may protrude from the first plate 2000 toward the inner space. The adjustable cover 210 may be provided in the inner space. Therefore, the guide rail 2004 may protrude toward the adjustable cover 210.

The stationary cover 200 may further include a guide rail protrusion 2005 protruding from the inner surface of the stationary cover 200 toward the second elevating cover 210. The guide rail protrusion 2005 may protrude from the first plate 2000 toward the inner space.

The guide rail 2004 may be coupled to the inner surface of the stationary cover 200 so as to surround the guide rail protrusions 2005. In other words, the guide rail 2004 may be formed as a separate member from the first plate 2000 and be coupled. This will be described in detail below.

A pair of the guide rails 2004 may be provided on the first plate 2000. The guide rail 2004 may include a first guide rail 2004*a* and a second guide rail 2004*b* which are spaced apart from each other and extend in the vertical direction.

The first plate 2000 may include a water outflow or dispenser opening 2008 opened toward the dispenser side cover 220. The dispenser side cover 220 may also have a through-hole corresponding to the dispenser opening 2008. In other words, the dispenser opening 2008 may be an opening communicating with the internal space of the case 10.

The dispenser opening 2008 may correspond to a hole through which the water outflow pipe extending to the water outflow or dispenser nozzle 240 passes. The water outflow pipe may extend from the inner part of the case 10 and may be connected to the water outflow nozzle 240 through the dispenser opening 2008, so as to supply water or liquid to be taken to the dispenser nozzle 240.

The dispenser opening 2008 may be formed between the first guide rail 2004*a* and the second guide rail 2004*b*. In other words, the first guide rail 2004*a* and the second guide rail 2004*b* may be formed on both sides of the dispenser opening 2008, respectively.

The stationary cover 200 may further include a guide protrusion 2006 protruding from the inner surface of the stationary cover 200 toward the adjustable cover 210. The guide protrusion 2006 may protrude from the second plate 2002 toward the inner space. The guide protrusion 2006 may extend from the upper end to the lower end of the second plate 2002 in the vertical direction. The guide protrusions 2006 may protrude from both side surfaces of the stationary cover 200, respectively.

The guide protrusion 2006 and the guide rail protrusion 2005 or the guide rail 2004 may protrude perpendicularly to the inner space. Specifically, the guide protrusions 2006 may protrude from the inner surface of the stationary cover 200 in the lateral direction. The guide rail protrusion 2005 or the guide rails 2004 may protrude from the inner surface of the stationary cover 200 in the front direction.

The guide protrusion 2006 may be formed adjacent to the guide rail 2004. Thus, the guide protrusion 2006 and the guide rail 2004 may all be in contact with the coupling bracket 250. Hereinafter, the coupling bracket 250 will be described in detail.

Figure 8:
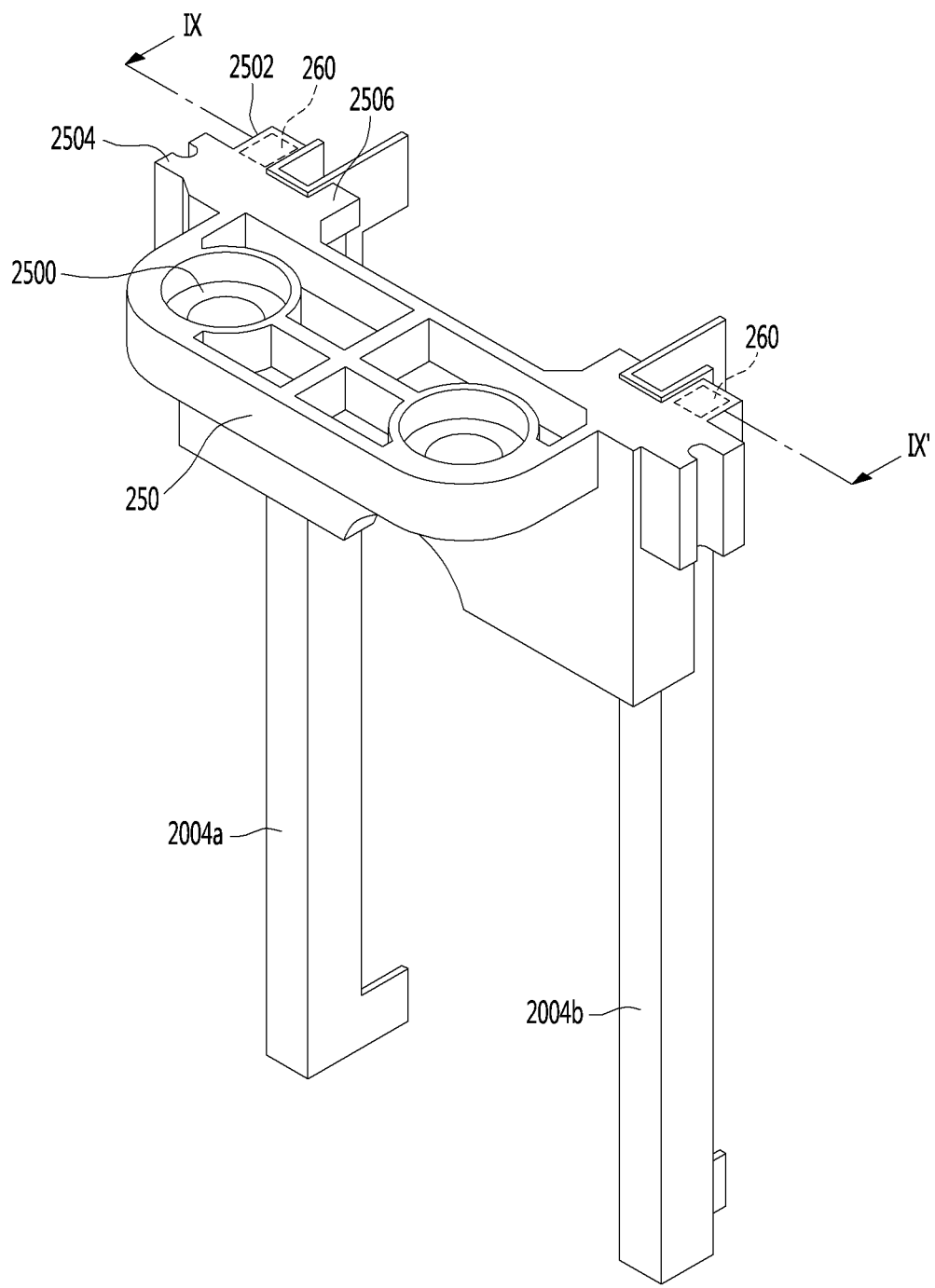
FIG. 8 illustrates lifting and lowering structure of the water purifier according to an embodiment.
Figure 9:
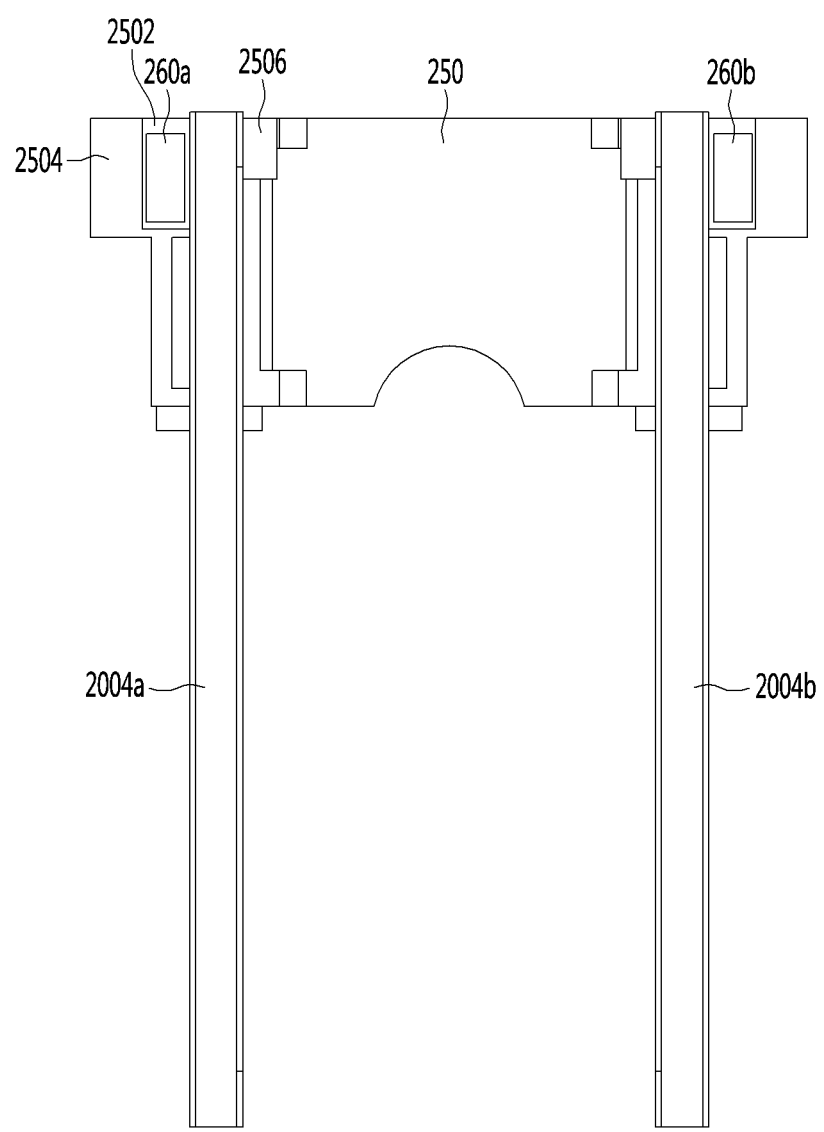
FIG. 9 is a sectional view taken along line IX-IX' of FIG. 8.

As illustrated in FIGS. 8 and 9, the coupling bracket 250 may be formed with a fixing coupling hole 2500 into which a coupling member may be inserted. The coupling member may be configured to couple the coupling bracket 250 and the moving plate 2100.

The fixed coupling hole 2500 may be recessed downward from the upper end of the coupling bracket 250. The fixed coupling hole 2500 may be spaced apart from both sides. In other words, a pair of the coupling members may be provided and inserted into the fixing coupling holes 2500, respectively.

Accordingly, the coupling member may be inserted into the fixed coupling hole 2500 from an upper part of the coupling bracket 250. In addition, the coupling member may extend to the coupling part 2104 of the moving plate 2100 and may be coupled. Thus, the coupling bracket 250 and the moving plate 2100 may be variously coupled. In addition, the coupling bracket 250 and the moving plate 2100 may be integrally formed with each other.

The coupling bracket 250 may include a magnet 260 provided on one side of the guide rail 2004. An attractive force may be applied between the magnet 260 and the guide rail 2004.

The magnet 260 may be a permanent magnet having a predetermined magnetic force. The guide rail 2004 may be made of a material having a property that the magnet 260 is attached thereto. For example, the guide rail 2004 may be formed of a steel plate.

The magnets 260 may have a size corresponding to the horizontal protruding distance of the guide rail 2004. In other words, the magnet 260 may have a size equal to or smaller than a distance that the guide rail 2004 protrudes from the first plate 2000 in a horizontal direction. For example, the magnet 260 may be provided in a circular shape having a diameter equal to the protruding distance of the guide rail 2004.

The first and adjustable covers 200 and 210 except for the guide rail 2004 may be made of a material to which the magnet 260 is not attracted so as not to affect the attractive force applied to the magnet 260 and the guide rail 2004. For example, the first and adjustable covers 200 and 210 except for the guide rail 2004 may be formed of aluminum.

Accordingly, the guide rail 2004 may be provided separately from the first plate 2000 and coupled. As illustrated in FIG. 8, the guide rail 2004 may be bent in a shape and may be fitted to the first plate 2000. The guide rail 2004 may be provided in various shapes to surround the guide rail protrusions 2005 and to be coupled to the stationary cover 200.

The coupling bracket 250 may include a magnet receiving protrusion or pocket 2502 in which the magnet 260 is received. The magnet receiving protrusion 2502 may protrude toward the dispenser side cover 220 so as to be adjacent to the inner surface of the stationary cover 200 on which the guide rail 2004 is disposed.

The magnet receiving protrusion 2502 may protrude toward the first plate 2000 so as to be in contact with the guide rail 2004. As the magnet receiving protrusions 2502 may be in contact with the guide rails 2004, an attractive force may be applied between the magnets 260 and the guide rails 2004.

The magnet 260 and the guide rail 2004 may not be in direct contact with each other. The attractive force between the magnet 260 and the guide rail 2004 may thus be prevented from becoming unnecessarily large.

The attractive force between the magnet 260 and the guide rail 2004 may be provided to the extent that the attractive force supports the water outflow nozzle 240 and the adjustable cover 210. Accordingly, the water outflow nozzle 240 may be stably supported at various positions.

The attractive force between the magnet 260 and the guide rail 2004 may be provided to the extent that the magnet 260 may move in the vertical direction with respect to the guide rail 2004 by the external force of the user. In other words, the adjustable cover 210 may be moved even if the user does not apply a large external force thereto.

The coupling bracket 250 may include auxiliary protrusions 2506 spaced apart from the magnet receiving protrusions 2502 to one side. The auxiliary protrusions 2506 may protrude toward the dispenser side cover 220 so as to be adjacent to the inner surface of the stationary cover 200 on which the guide rails 2004 are disposed.

In particular, the auxiliary protrusion 2506 may protrude toward the first plate 2000 so as to be in contact with the guide rail 2004. The guide rail 2004 may be provided between the magnet receiving protrusions 2502 and the auxiliary protrusions 2506. The auxiliary protrusion 2506 may be understood as an auxiliary configuration for stably being in contact with the magnet receiving protrusions 2502 and the guide rail 2004.

The coupling bracket 250 may include coupling guide protrusions 2504 that protrude toward the second plate 2002 to be in contact with the guide protrusions 2006. The coupling guide protrusions 2504 may protrude in both directions from the coupling bracket 250 corresponding to the guide protrusions 2006 formed on both sides of the second plate 2002.

Each of the coupling guide protrusions 2504 may be provided as a pair spaced apart from each other such that the guide protrusions 2006 are received therebetween. Accordingly, the guide protrusion 2006 and the coupling guide protrusion 2504 may be fitted to each other.

As illustrated in FIG. 8, the magnet receiving protrusions 2502 or the auxiliary protrusions 2506 and the coupling guide protrusions 2504 may protrude in directions perpendicular to each other. The magnet receiving protrusions 2502 or the auxiliary protrusions 2506 may protrude in the rear direction, and the coupling guide protrusions 2504 may protrude in the lateral direction.

As described above, a pair of the guide rails 2004 may be provided. Accordingly, a pair of magnets 260 may also be provided. The magnet receiving protrusions 2502 and the auxiliary protrusions 2506 may also be provided in pairs corresponding to this. A first magnet 260a provided on one side of the first guide rail 2004a and a second magnet 260b provided on one side of the second guide rail 2004b may be provided.

As illustrated in FIG. 9, the first magnet 260a, the first guide rail 2004a, the second guide rail 2004b, and the second magnet 260b may be sequentially provided in the horizontal direction. The first magnet 260a and the second magnet 260b may be spaced apart to be farther than the first guide rail 2004a and the second guide rail 2004b.

Such an arrangement may minimize the influence on the attractive forces applying to each other. In other words, an attractive force may be applied between the first magnet 260a and the first guide rail 2004a, and an attractive force may be applied between the second magnet 260b and the second guide rail 2004b.

The first magnet 260a and the second magnet 260b may apply an attractive force to the first guide rail 2004a and the second guide rail 2004b, respectively and may be movable in the vertical directions. In other words, the attractive force may be applied between the magnet 260 and the guide rail 2004 to slide the coupling bracket 250 along the guide rail 2004. Accordingly, the adjustable cover 210 may be lifted and lowered from the stationary cover 200.

The adjustable cover 210 and the dispenser nozzle 240 installed therein may be smoothly moved. This may be caused by the attractive force applied between the magnet 260 and the guide rail 2004 so that the magnet 260 is slidingly moved in a state of being in contact with the guide rail 2004.

The water outflow nozzle 240 may also be arranged at a position desired by the user. This may also be caused by the attractive force applied between the magnet 260 and the guide rail 2004, and therefore when the external force is removed at any position, the water outflow nozzle 240 may be stopped at that position.

As a result, the user may simply move the water outflow nozzle 240 as needed. Then, the water or liquid outflow may be performed at a position adjacent to the water intake container by the lifting and lowering of the water outflow nozzle 240. Accordingly, it may be possible to prevent the water or liquid to be discharged from being scattered. Particularly, in a case where the water at a very high temperature is discharged, it may be possible to prevent the scattering of water, thereby assuring the stability of the user.

The water purifier according to an embodiment may include a case and a water outflow unit coupled to one side of the case. The water outflow unit may include a water outflow side cover which is seated in the case, a stationary cover coupled to the water outflow side cover, a adjustable cover movably received in an inside of the stationary cover, and a water outflow nozzle which is installed on the adjustable cover and from which water is discharged.

The stationary cover may include a guide rail protruding toward the adjustable cover and extending in a vertical direction. The adjustable cover may include a coupling bracket provided with a magnet disposed on one side of the guide rail so that the attractive force is applied to the guide rail. As the coupling bracket is slidably moved along the guide rail by the attractive force being applied between the magnet and the guide rail, the adjustable cover may be lifted and lowered from the stationary cover.

The water purifier according to an embodiment configured as described above may have the following effects. As the lifting and lowering cover in which the water outflow nozzle is installed according to the user's need is moved, the convenience of the user may be increased and the stability thereof can be assured.

In particular, as the user applies external force to the lifting and lowering cover, the lifting and lowering cover may be slidably moved so that the water outflow nozzle may be lifted and lowered smoothly, and thus a user's convenience may be further increased. In addition, the water outflow nozzle may be provided at a position desired by the user. Particularly, when the user places the water outflow nozzle at the desired position and removes the external force, the water outflow nozzle may be stably fixed by the attractive force of the magnet.

Water scattering may be prevented as the water outflow nozzle is lowered corresponding to the height of a water intake container. In a case where hot water with a high temperature is taken, the safety of the user may be assured. The water outflow nozzle may be rotatably provided in a horizontal direction, and thus the user may freely move the water outflow nozzle as needed.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser comprising:
    a case; and
    a dispenser coupled to the case, wherein the dispenser includes:
        a dispenser side cover coupled to the case;
        a stationary cover coupled to the dispenser side cover;
        an adjustable cover configured to be movable within the stationary cover; and
        a dispenser nozzle installed at the adjustable cover and configured to discharge liquid,
    wherein the stationary cover includes a guide rail that extends in a vertical direction,
    wherein the adjustable cover includes a coupling bracket including at least one magnet positioned to be on one side of the guide rail so that an attractive magnetic force is applied to the guide rail, and
    wherein as the adjustable cover is moved with respect to the stationary cover, the coupling bracket is moved along the guide rail.

2. The liquid dispenser of claim 1, wherein the guide rail includes a first guide rail and a second guide rail spaced apart from the first guide rail, the first and second guide rails extending in the vertical direction, and wherein the at least one magnet comprises a first magnet positioned on one side of the first guide rail and a second magnet positioned on one side of the second guide rail.

3. The liquid dispenser of claim 2, wherein the first magnet, the first guide rail, the second guide rail, and the second magnet are provided sequentially in a horizontal direction, and wherein the first magnet and the second magnet are magnetically attracted to the first guide rail and the second guide rail, respectively, and are capable of moving in the vertical direction with respect to the first and second guide rails.

4. The liquid dispenser of claim 2, wherein the stationary cover includes an opening formed between the first guide rail and the second guide rail to allow an inside of the case to communicate with an inside of the stationary cover.

5. The liquid dispenser of claim 4, further comprising an outflow pipe that extends from the inside of the case and is connected to the dispenser nozzle through the opening so as to supply liquid from the case to the dispenser nozzle of the adjustable cover.

6. The liquid dispenser of claim 1, wherein the coupling bracket includes:
    a first protrusion having a magnet pocket configured to receive the at least one magnet; and
    a second protrusion spaced apart from the first protrusion to one side, and wherein the guide rail is positioned between the first protrusion and the second protrusion.

7. The liquid dispenser of claim 6, wherein the first protrusion and the second protrusion protrude toward the dispenser side cover so as to be adjacent to an inner surface of the stationary cover on which the guide rail is disposed.

8. The liquid dispenser of claim 7, wherein the stationary cover further includes a guide rail protrusion that protrudes from the inner surface of the stationary cover toward the adjustable cover, and wherein the guide rail is coupled to the inner surface of the stationary cover and configured to surround the guide rail protrusion.

9. The liquid dispenser of claim 1, wherein the stationary cover includes:
    a first plate coupled to the dispenser side cover; and
    a second plate attached to the first plate and configured to form an inner space with the first plate, wherein the adjustable cover is movably received in the inner space.

10. The liquid dispenser of claim 9, wherein the stationary cover further includes a guide protrusion that protrudes from the second plate toward the inner space and extends in the vertical direction, and wherein the guide rail protrudes from the first plate toward the inner space.

11. The liquid dispenser of claim 10, wherein the coupling bracket includes:
    a first protrusion that protrudes toward the first plate and is in contact with the guide rail, the magnet being provided in a magnet pocket provided in the first protrusion; and
    a coupling guide protrusion that protrudes toward the second plate so as to be in contact with the guide protrusion.

12. The liquid dispenser of claim 11, wherein the first protrusion protrudes in a first direction and the coupling guide protrusion protrudes in a second direction, the first and second directions being perpendicular to each other.

13. The liquid dispenser of claim 12, wherein the adjustable cover includes a moving plate having a shape that corresponds to the second plate and including the dispenser nozzle provided at a lower part thereof,
    wherein the moving plate includes:
        a coupling part configured to couple with the coupling bracket; and
        a grip positioned below the coupling part and formed on an outside of a side surface of the moving plate so as to be gripped by a user.

14. The liquid dispenser of claim 1, wherein the dispenser side cover is rotatably coupled to the case in a horizontal direction, and wherein the stationary and adjustable covers and the dispenser nozzle are rotated as the dispenser side cover is rotated.

15. The liquid dispenser of claim 14, further comprising a tray rotatably coupled to a base cover that forms a bottom surface of the case, wherein the tray is configured to be rotatable to correspond with the rotation of the dispenser side cover such that the tray is provided below the dispenser nozzle in the vertical direction.

16. A liquid dispenser comprising:
a case; and
a dispenser attached to the case, wherein the dispenser comprises:
a stationary cover including a pair of guide rails spaced horizontally from each other and extending from a top to a bottom of the stationary cover; and
an adjustable cover accommodated within the stationary cover and configured to vertically move with respect to the stationary cover; wherein the adjustable cover comprises:
a coupling bracket fixed to a top of the adjustable cover;
a pair of magnets accommodated within the coupling bracket and corresponding to the pair of guide rails in the stationary cover; and
a dispenser nozzle configured to dispense liquid from the case, wherein the pair of magnets are magnetically attracted to the pair of guide rails, respectively, such that the adjustable cover is configured to be moved or held in place at a plurality of vertical points along the pair of guide rails.

17. The liquid dispenser of claim 16, wherein the coupling bracket further comprises a pair of protrusions corresponding to the pair of magnets, wherein a first guide rail of the pair of guide rails is configured to be located between a first magnet of the pair of magnets and a first protrusion of the pair of protrusions, and a second guide rail of the pair of guide rails is configured to be located between a second magnet of the pair of magnets and a second protrusion of the pair of protrusions.

18. The liquid dispenser of claim 17, wherein the coupling bracket further comprises a pair of magnet pockets configured to accommodate the pair of magnets, respectively.

19. The liquid dispenser of claim 18, wherein the stationary cover comprises a first guide protrusion provided on a first inner lateral side of the stationary cover and a second guide protrusion provided on a second inner lateral side of the stationary cover opposite the first inner lateral side.

20. The liquid dispenser of claim 19, wherein the coupling bracket further comprises a first coupling guide protrusion on a first lateral side of the coupling bracket and a second coupling guide protrusion on a second lateral side of the coupling bracket opposite the first lateral side, wherein the first and second coupling guide protrusions guide the coupling bracket vertically along the first and second guide protrusions.

* * * * *